United States Patent [19]

Schell

[11] 3,885,612

[45] May 27, 1975

[54] MATERIAL SHAPING PLATFORM WITH MULTIPLE OR EXCHANGEABLE TEMPLATES

[75] Inventor: Friedrich Peter Schell, Las Vegas, Nev.

[73] Assignee: Revolution, Inc., Las Vegas, Nev.

[22] Filed: Dec. 10, 1973

[21] Appl. No.: 422,926

Related U.S. Application Data

[60] Division of Ser. No. 214,007, Dec. 30, 1971, Pat. No. 3,797,543, which is a continuation-in-part of Ser. Nos. 129,507, March 30, 1971, Pat. No. 3,739,826, and Ser. No. 198,727, Nov. 15, 1971, abandoned.

[52] U.S. Cl................ 144/145 R; 83/413; 90/13.6; 144/323
[51] Int. Cl.............................................. B27c 5/06
[58] Field of Search........ 144/144, 145 R, 154, 321, 144/323, 325, 144 S, 145 A, 145 B, 145 C, 137; 90/13.5, 13.6; 83/413, 565

[56] References Cited
UNITED STATES PATENTS

| 3,442,309 | 5/1969 | Jertsch............................. 83/413 X |
| 3,459,104 | 8/1969 | Parsons, Sr. ................ 144/145 R X |
| 3,473,580 | 10/1969 | Dunn et al. ................. 144/145 R X |
| 3,739,826 | 6/1973 | Schell ................................ 144/323 |
| 3,797,543 | 3/1974 | Schell............................. 144/145 R |
| 3,800,842 | 4/1974 | Schell.......................... 144/145 R X |

*Primary Examiner*—Andrew R. Juhasz
*Assistant Examiner*—W. D. Bray
*Attorney, Agent, or Firm*—Jerry R. Seiler

[57] ABSTRACT

A rotatable and reciprocating device for supplying material workpieces to be shaped to a shaping tool comprises a platform to which the workpieces are attached, a template disposed adjacent the platform, a guide member abutting the template, and a biasing means cooperating with the platform for constantly maintaining the template and guide member in abutment. In one embodiment, the guide member or template are attached to an axle for the rotatable platform while the other of these members is secured to a stationary member. In another embodiment, a plurality of template surfaces are attached directly to the platform and arranged in a vertical stack relative to the platform surface or arranged horizontally thereon. A further embodiment includes a pivotal carriage.

1 Claim, 11 Drawing Figures

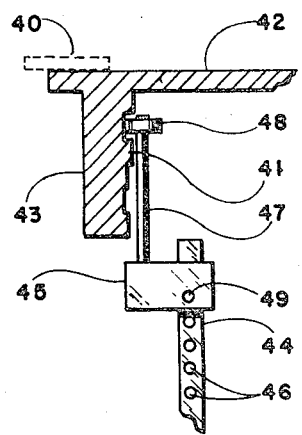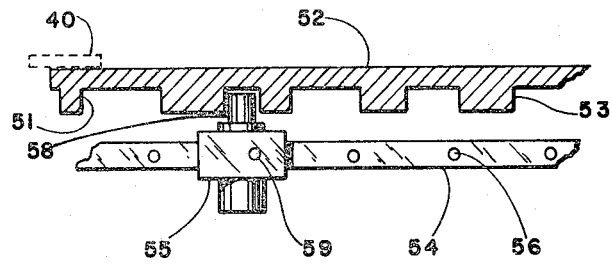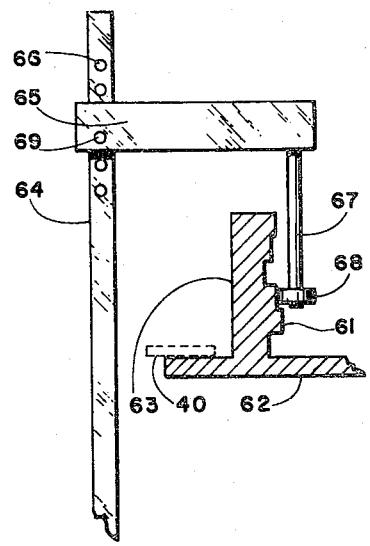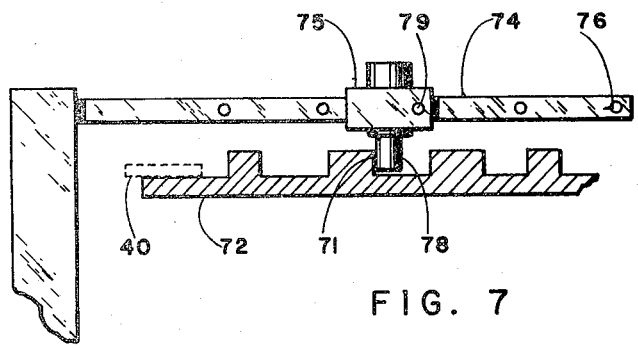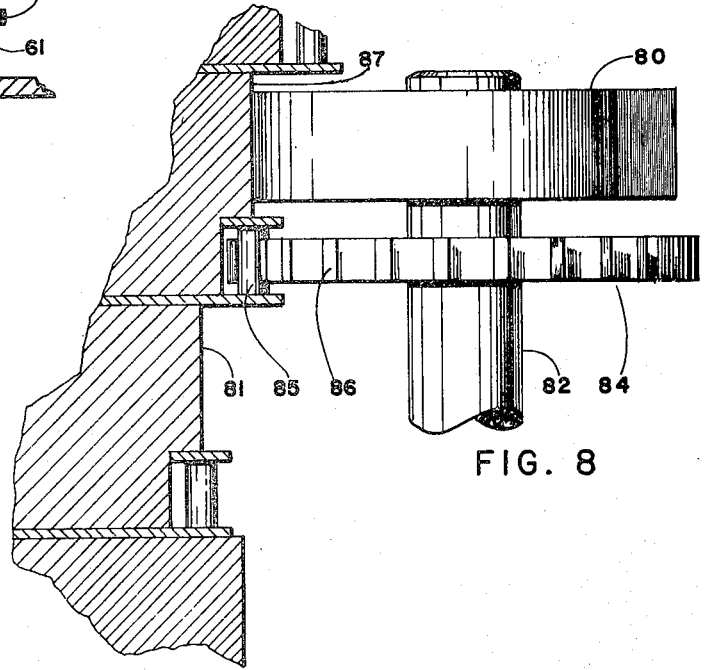

MATERIAL SHAPING PLATFORM WITH MULTIPLE OR EXCHANGEABLE TEMPLATES

BACKGROUND OF THE INVENTION

This is a division, of application Ser. No. 214,007, filed Dec. 30, 1971 now U.S. Pat. No. 3,797,543 which is a continuation-in-part of my co-pending applications Ser. Nos. 129,507, filed Mar. 30, 1971 now U.S. Pat. No. 3,739,826 and 198,727, filed Nov. 15, 1971, now abandoned.

A number of devices exist for shaping wood and other materials. Although certain of such devices are relatively simple in design, those which are presently available for reproducing various shapes on materials from a template or other predetermined shape are rather complex and expensive. These latter devices are known in the art as profilers or shapers which incorporate a rotating table to which table a template or other shaped piece of material is attached. A shaping tool extends downwardly from an overarm and follows the edge profile of the template and as the table rotates, the shaping tool reproduces the template profile on a material workpiece. Even more sophisticated shaping devices incorporate electronic, computer or tape command means in lieu of a template.

There are a number of problems and disadvantages associated with such prior art devices. A major and important problem is that an operator is required to be near the cutting or shaping tool which close proximity increases the danger of accidental injury to the operator. Injury may result from direct contact of a finger or hand with the cutting tool or the operator may be injured by a piece of cut material propelled by the shaping tool.

Another major disadvantage is in the limitation of the size of the workpiece which may be handled by the particular device. Such a limitation is generally inherent in the apparatus itself because of the various support means present for either the table or the shaping tool. For example, even very expensive shaping or profiling apparatus incorporate a massive side column and an overarm from which the shaping tool or tools extend. Since the overarm and column are fixedly attached to a floor stand or lower frame member to which the table is also attached, there is a limited distance between the table and the column which distance dictates the size of the material workpiece which can be shaped. A further disadvantage is that in order to change the template, or remove the finished workpiece, the device must be stopped thereby significantly slowing the operation.

In addition, such equipment which may be over engineered and unneccessarily complex for many operations is also undesirable from a cost standpoint and requires rather expensive maintenance costs. Where computer or tape reader control systems are utilized, cost and maintenance disadvantages are magnified. Further, once such equipment is placed, because of the weight of the apparatus, sometimes in excess of 20,000 pounds, relocation of the apparatus is obviously difficult.

An additional disadvantage in prior art devices of the type of above described is in the limitation of the type of shaping, cutting or working tools or head assemblies which can be attached. Although such a device may utilize router bits or similar cutting means interchangeably, they are generally unsuitable for sanding, planing, painting, polishing, clamping, pressing or stapling. In other words, once the material workpiece is initially shaped, it must be finished by removing it from the apparatus and working it with independent units which the initial shaping or profiling apparatus is incapable of incorporating.

In my copending application Ser. No. 129,507, now U.S. Pat. No. 3,739,826 there is described a device for feeding material be be shaped to a shaping or working tool which device comprises a rotatable platform having biasing means which constantly urge the platform towards the shaping tool. The platform has attached thereto a material workpiece which is to be shaped while the platform moves both reciprocally relative to the shaping tool and at the same time rotates about a central axis. The edge of the platform acts as a template and is provided with the shape to be reproduced on the material workpiece. Further, a guide member is fixedly positioned adjacent the shaping tool and is maintained in substantially continuous abutment with the shaped platform edge by a biasing spring attached to the platform.

In my aforesaid application Ser. No. 198,727 there is disclosed an improved device in one embodiment incorporating a platform having transverse motion while the platform travels along a linear direction normal to the working tool. In a second embodiment an eccentric motion is provided by means attached between the platform and platform support in shaping a material workpiece attached thereto. However, again the edge of the platform acts as a template which abuts a guide member cooperating with and adjacent a working or shaping tool. Accordingly, as disclosed in the aforesaid applications, a guide member located at a fixed position relative to the working tool is maintained in abutment with the edge of the platform which acts as a template while the platform is biased toward the working tool.

In certain operations it may be desirable to utilize a variety of different templates having different shapes for producing a variety of shapes on material workpieces. Thus, interchangeability of the templates is a feature which a single platform having a selected template edge cannot provide.

A further problem with prior devices is in the proximity of the template and guide member with the working tool. It will be appreciated that where precise reproduction of a shape on a material workpiece is required, guidance of the platform to which the workpiece is attached as it is being shaped by the working or shaping tool is critical. Thus, where even minute pieces of material such as sawdust, cuttings, shavings and the like become lodged and collected between the guide member and template surface, it will cause the platform to be somewhat displaced due to the interference of the undesirable materials between the abutting surfaces. In other words, any excess displacement of the platform caused by materials wedged between the guide member and template will yield an untrue shape reproduction of the template design on the workpiece being shaped.

It is to the avoidance of such problem as well as to provide for multiple or exchangeable templates utilizing the same or single platform that the present invention is directed. Further, the present device is designed to increase production line capabilities of the material feeding platform to one or more stationary working or shaping tools. Moreover, the concept of the invention may be utilized to afford reduction of injury since an operator need not tend to the workpieces or platforms to which they are attached at the time of shaping thereby diminishing the chance of operator injury. These as well as other advantages will be evident from the following detailed description.

SUMMARY OF THE INVENTION

The present invention comprises a device for guiding a material workpiece including a rotatable and reciprocating platform which rotates about a driven axle. A guide member is disposed adjacent a template which template is secured to to the axle and which template is biased so as to be maintained in abutment with the guide member. Alternatively, the positions of the guide member and template may be reversed, i.e., the guide member may be located on the axle with the template adjacent thereto and again maintained in abutment therewith. The template may be exchanged so that templates of varying shapes and sizes may be alternately used. Further, the template and guide member, the interaction and cooperation thereof which will determine the guidance of the platform relative to a stationary shaping or cutting tool, are not located adjacent the cutting tool. Such a feature obviates the disadvantage of pieces of the material from the cutting or shaping operation becoming lodged or otherwise accumulated on either the guide member to template surface. Further, since the template is displaced from the area of the cutting or shaping tool, even with the tool running or otherwise in operation, it may be exchanged for a different template by an opeator without the danger of being in close proximity to the cutting tool.

In another embodiment, a plurality of template surfaces are fixed to the upper or lower platform surface so that a variety of shapes on a material workpiece can be made without changing the platform. Template exchange may be accomplished by merely moving the platform or guide member thus indexing a different template.

In a further embodiment, a pivotal carriage attached to a platform and a platform support through an arrangement of arms allows the direction of a reciprocating platform to be varied so that the platform can be moved or indexed at different stationary shaping tools. These as well as other features of the device of the invention will be more fully explained hereinafter.

BRIEF DESCRIPTION OF THE DRAWINGS

FIG. 4 is a partial side elevational view showing a platform in section incorporating a plurality of template surfaces stacked vertically thereunder;

FIG. 5 is a view similar to FIG. 4 showing a plurality of templates extending along a horizontal platform surface;

FIG. 6 is a view similar to FIG. 4 wherein the plurality of template surfaces are stacked on the upper platform surface;

FIG. 7 is a view similar to FIG. 5 wherein the templates are located on the upper side of a platform;

FIG. 8 illustrates a side elevational view, partly in section of means for guiding and driving a platform utilizing a plurality of templates;

DETAILED DESCRIPTION OF THE INVENTION

Figure 2:
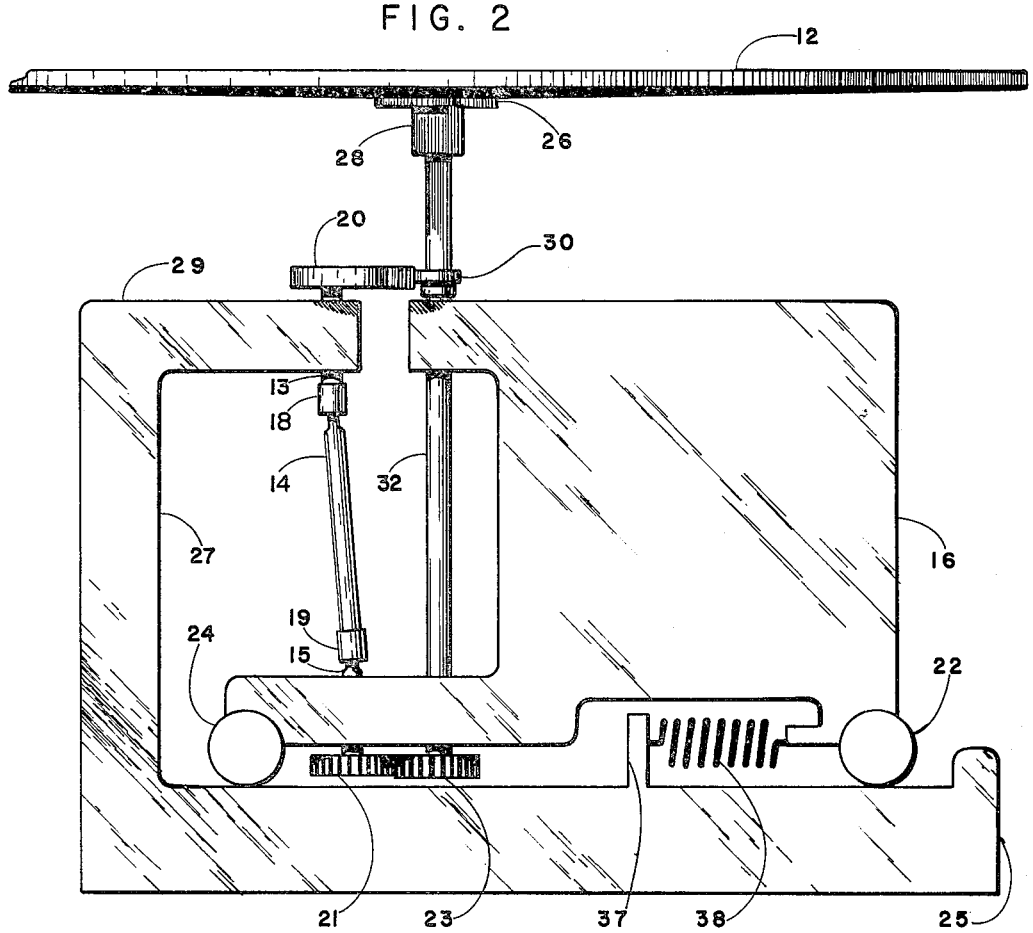
FIG. 2 gives a side elevation view of one embodiment of the invention.

Referring to FIG. 2, there is illustrated a device comprising a platform 12 on the upper surface of which are to be attached material workpieces to be shaped by a working tool (not shown). A platform carriage 16 is provided with rollers or wheels 22 and 24 for guiding the platform carriage in a reciprocal motion right and left or normal to the angle of view. However, it should be appreciated that the means such as rollers on tracks and the like are not critical and instead any other means for maintaining the proper guidance of the reciprocating platform carriage may be utilized as will be appreciated by those skilled in the art.

Platform carriage 16 rests on a base member 25 having an upright support 27 at one end thereof and arm 29 extending from the upper end of support 27. Axle 32 extends through carriage 16 the upper end of the axle being attached to the underside of platform 12 at its center. For this purpose mounting member 26 may be bolted or otherwise secured to the underside of the platform 12 and the upper of end of axle 32 secured in sleeve 28 as shown. Other equivalent means may be used for this purpose.

The reciprocal movement of carriage 16 and platform 12 is determined by template 20 and guide member 30, the latter, in this embodiment being shown as attached to axle 32. The side of template 20 is maintained in abutment with the side of the guide member as shown by a biasing means in the form of a spring 38 which is attached to carriage 16 and base member 25 at post 37. Thus, spring 38 will constantly bias or pull carriage 16 to the left as FIG. 2 is viewed and concomitantly, guide member 30 will be maintained in abutment with template 20.

The template may have any shape depending on the desired shape to be reproduced on a material workpiece. As shown, template 20 is generally circular and revolves on off-set rod 13 in an eccentric manner which will be reflected on the reciprocating motion of carriage 16 and rotatable platform 12 as the device is operated. As shown, the ends of shaft 16 are attached to rods 13 and 15 respectively while the latter is secured to gear wheel 21. Universal joint or similar means of attachment of the shaft ends within sleeves 18 and 19 may be provided so that as the angle of shaft 16 is varied, rotation of template 20 will not be affected. Since gear wheel 23 is indexed or meshed with gear wheel 21, a common drive means for these gears and in turn template 20 and platform 12 may be provided so that the speed of rotation is substantially the same. In turn, as the distance between the axis about which template 20 rotates and abutting edge of guide member 30 becomes greater, carriage 16 will be displaced to the right as FIG. 2 is viewed. As this distance becomes smaller and due to the biasing force provided by spring 38, the carriage will be displaced to the left as the side of guide member 30 is maintained in abutment with the side of template 20. This reciprocating movement or motion of the carriage will be reflected in the reciprocal travel of platform 12 which at the same time is rotating about axle 32. However, it will also be appreciated that template 20 will remain stationary during this operation except for rotation. Thus, a material workpiece attached to the upper surface of platform 12 will be shaped according to the movement provided by the device with the cooperating template 20.

It should be understood that the template need not be driven as shown so long as it is capable of rotation so as to impart reciprocal motion to the platform via guide member 30 and cooperating carriage 16. Further, the template may be removeably attached to the upper end of rod 13 by any convenient means so that templates of different sizes or shapes may be exchanged thereby affording a great versatility to the variety of shapes into which a material workpiece attached to platform 12 can be formed. The only restriction is that a working, shaping or cutting tool be placed adjacent platform 12 so that it can contact a material workpiece attached to the platform during the shaping operation. Again, platform 12 will be rotating so that material workpieces attached to the platform will be directed to the shaping tool and at the same time the shape will be determined by the reciprocal movement of the platform depending on the shape of the template 20. Moreover, a plurality of material workpieces may be attached to the platform in the desired position and then be removed by the operator following the shaping or subsequent working or treating operation.

It will also be noted that template 20 and guide memeber 30 are positioned so that they are not exposed to an area adjacent the edge of platform 12. This feature will prevent bits of materials cut from a material workpiece by a working tool adjacent the platform edge from becoming lodged between the template and guide member abutting surfaces which would result in inaccurate reproduction of the template shape.

It should also be appreciated that a single template design or shape shown in FIG. 2 may be modified by having a plurality of different template surfaces stacked vertically on a template member. Guide member 30 may then a keyed along the upper portion of axle 32 so that it can be moved upwardly and downwardly therealong and secured for abutment of the different template surfaces depending on the workpiece shape desired. However, in order to incorporate such an embodiment, the guide member will have to be enlarged or otherwise modified so that its surface for abuttment against the template surface will be extended outwardly from the axle at a greater distance than that shown in FIG. 2 to avoid interference of certain of the template surfaces with the upper portion of axle 32 as a device operates.

Figure 3:
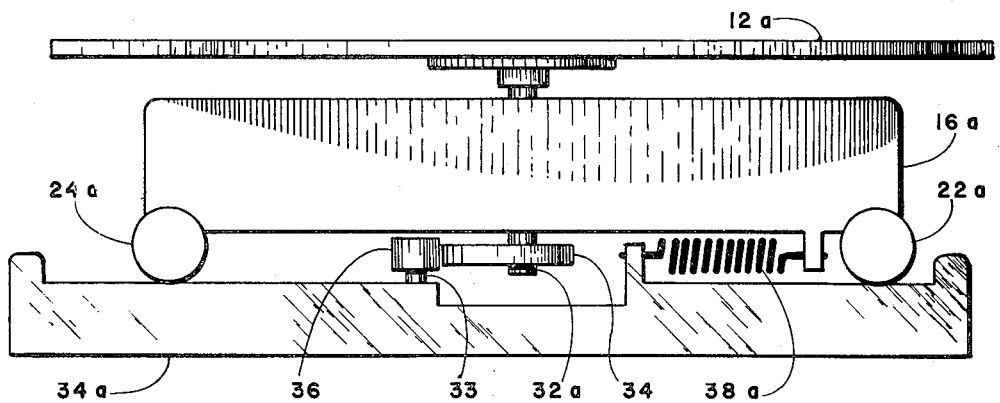
FIG. 3 is a side elevational view of another embodiment of the invention.

Referring now to FIG. 3, a similar embodiment of the device shown in FIG. 2 is illustrated, the major exception being that the relative positions of the template and guide member have been exchanged. Thus, template 34 is attached adjacent the lower end of axle 32a while guide member 36 is secured and extends from base member 34a. Platform carriage 16a rests on base member 34a and is guided therealong in reciprocal travel normal to the angle of viewing by wheels or rollers 22a and 24a. However, again it should be appreciated that any other means of guiding the reciprocal movement of the carriage and concomitantly the platform may be provided and that the wheels and rollers are only by way of example. Although no drive means for rotating platform 12a is shown, it will be understood that any power source may be used for this purpose such as a friction or gear drives cooperating with suitable gears and the like with the surface of the platform or to workpieces attached thereto or by drive belts or gears cooperating with axle 32a.

The reciprocal travel of carriage 16a and platform 12a right and left along a plane normal to the angle of viewing is provided by spring 38a which constantly urges the carriage toward the left so that the surface of template 34 will be maintained in aubtment with the side surface of guide member 36. Guide member 36 is rotatably mounted on a shaft 33 which extends from base member 34a. Thus, an axle 32a is driven resulting in rotation of platform 12a, template 34 will also be rotated. As, the distance between the side of the template and its axis of rotation is varied the distance between the nearest side surface of guide member 36 and the template axis of rotation will also be varied resulting in the reciprocal movement of carriage 16a and platform 12a. This rotating and reciprocal motion will be applied to a material workpiece which is attached to the upper surface of the platform in a manner similarly described hereinabove regarding FIG. 2.

A working or shaping tool disposed adjacent platform 12a will cut or shape a material workpiece attached thereto as the device is operated. The shaping tool may be placed at any desired position adjacent the platform for either of the devices illustrated. However, the location of the shaping tool will also influence the shape formed on a material workpiece which of course primarily depends on the template shape. Accordingly, if a shaping tool is located to the right of the platform shown in FIG. 2 and in line with the direction of the platform's reciprocating travel, the shape formed on a workpiece will be different from that were the tool located at the left side utilizing the template shape shown. Moreover, changes in the distance between a shaping tool and the platform will also cause shape variations.

It should also be appreciated that the embodiment shown in FIG. 3 may also be applied to that of FIG. 2 so that the features and designs of the latter are not critical but are only illustrative of the design characteristics of the device to carry out the desired function. Accordingly, the device of FIG. 3 can be modified so that template 34 and guide member 36 may be exchanged as in turn, in FIG. 2, template 20 and guide member 30 may also be exchanged. In either case, the device will work in the same manner as described.

Another advantage of the device shown in FIG. 3 is that a material piece which has previously been shaped and which shape is desired to be reproduced on other material workpieces and for which shape no template has been previously formed, may be used to make a template of the desired design. Thus, with a material workpiece attached to platform 12a a second guide member may be substituted for the cutting tool so that the second guide member's edge contacts the shaped workpiece at the same location that the cutting tool bit or head will cut a subsequently unshaped workpiece. At the same time a blank template blank which is to be shaped is placed on shaft 32a in place of the template 34. A cutting tool may then be substituted for guide member 36 and the drive or power source for rotating axle 32a and concomitantly platform 12a engaged. Thereafter, with co-action of the second guide member abutting the desired shaped surface of the shaped workpiece to be copied, will result in a reciprocal displacement of the platform and platform support member 16a. In turn the shaping tool which has been placed at the position of guide member 36 will form the desired shape of the template 34. Thus, a template may be cut from a wood or hard plastic blank or of a more permanent material such as metal stock utilizing a metal cutting tool. Such uses of the device of the invention as shown will be appreciated by those skilled in the art.

Reference is now made to FIGS. 4–7 illustrating another modification of incorporating a plurality of templates used in shaping a material workpiece. Referring first to FIG. 4 there is shown in side sectional elevation a portion of platform 42 which has attached thereto a material workpiece blank 40. Extending downwardly from the lower platform surface is template 43 having a plurality of template surfaces one of which is designated 41. In abutment with one of the template surfaces is guide member 48 which is rotatably mounted on shaft 47 which extends from support block 45. Guide member indexing arm 44 has a plurality of index notches 46 there-along so that support block 45 may be raised or lowered along the indexing arm and maintained in the proper position by pin 49 extending through the support block and into one of the notches 46 on indexing arm 44. Although a biasing means or spring is not shown, platform 42 will be continually biased by proper attachment of the spring to the platform or a platform carriage as described previously regarding FIGS. 2 and 3 herein or of the type set forth in the aforesaid co-pending applications the description of which is incorporated herein by reference. In this embodiment platform 42 will be biased to the right (viewing FIG. 4) thereby maintaining abutment of one of the template surfaces against rotatable but otherwise secured guide member 48. It should also be understood that template 48 will extend circumferentially around the platform or a portion thereof and that any of the template surfaces may be shaped to achieve a desired shape or design of any material workpiece placed on the platform. Moreover, a shaping tool may then be placed adjacent the rotating platform so that it will contact a material workpiece or plurality of workpieces attached to the platform. As the platform rotates while also moving from right to left in a reciprocal fashion which reciprocal motion will be dictated by the displacement of the platform relative to the shaping tool as guide member 48 abuts a template surface 41 a material workpiece will be shaped. When a different template surface is desired, an operator may simple remove pin 49 and raise or lower support block 45 along indexing arm 44 and resecure the support block there-along when guide member 48 rests at the desired template surface. It should also be appreciated that instead of raising and lowering support block 45 along indexing arm 44, the platform could be provided with means for raising and lowering it to achieve the same purpose as previously described.

FIG. 6 is similar to the concept illustrated in FIG. 4 except that template 63 extends from the upper surface of platform 62 and correspondingly indexing arm 64, index notches 66, indexing pin 69 and support block 65 are modified accordingly. Thus, shaft 67 and guide member 68 extend to template 63 from the upper side of platform 62 as shown to achieve the same desired function as discussed in FIG. 4. Again, template 63 is provided with a plurality of surfaces 61 so that material workpiece 40 may be shaped by a cutting or shaping tool located to contact a material workpiece attached to platform 62 as it rotates, again also having reciprocal motion right and left normal to the plane of viewing FIG. 6. Any number of template surfaces 61 may be provided on platform 62 as desired and the device shown in FIG. 4 may also be so modified.

The template with the plural template surfaces thereon may be permanently fixed to the platform or may be removable therefrom so that different templates may be so attached. It will also be understood that the working tool, not shown, may be placed anywhere so long as it contacts the material workpieces attached to the rotating platform. The tool may preferably or desirably be placed opposite the guide member so that there will be little if any possibility of materials which are displaced from a material workpiece lodging or accumulating along the guide member surface which could interfere with the shaping operation. Thus, the device shown in FIG. 4 may be preferred over thet shown in FIG. 6 since the template surfaces are underneath the platform so that the particles which are cut from a material workpiece will be unlikely to accumulate at a template surface.

Referring now to FIGS. 5 and 7 there are shown another means of providing a plurality of templates In FIG. 5, platform 52 is shown with a plurality of templates extending downwardly from the underside thereof two of which templates are 51 and 53, by way of example. The plurality of templates rather than being stacked vertically relative to the platform surface are instead located along the underside platform surface at varying distances from the center of the platform and circumferentially therearound. In this example platform 52 is biased to the right so that guide member 58 will be maintained in abutment with one of the template surfaces. When it is desired to change the template and concomittantly the shape of a material workpiece 40 which is being shaped by a working or cutting tool, support block 55 is simply moved to a different index notch 56 located along horizontally extending guide member indexing arm 54 by removing index pin 59, lowering guide member 58 and sliding support block to the desired position, raising the guide member and reinserting the index pin.

FIG. 7 illustrates the use of plural templates located on the upper surface of platform 72 whereby guide member 78 is secured above the platform along indexing arm 74. Again, platform 72 is biased to the right from the plane of viewing FIG. 7 and the guide member which is shown abutting template surface 71 may be relocated on a different template by removing index pin 79, raising guide member 78 and moving the support block 75 to another position, for example, index notch 76, lowering the guide member and reinserting the index pin. However, again, the use of templates on the upper platform surface may not be preferred since there is a greater likelihood that bits or shavings from a material workpiece might settle or be lodged on the template surfaces thereby altering the efficiency of some profiling or shaping operations. It will also be appreciated that the plurality of templates as shown at different locations on the platform surface may be permanently fixed thereto or removable as desired.

FIG. 8 illustrates another embodiment showing a device similar to that illustrated in FIG. 4 wherein guide member 80 is secured to an upper end of shaft 82 and is maintained in abutment with a template surface 87 extending from a platform (not shown). In this embodiment the platform is rotatably driven or governed by shaft 82 which rotates and is driven by a power source. For example, shaft 82 may itself be driven off of a shaping tool utilizing suitable speed reduction or governing gears or devices. Gear wheel 84 is secured to shaft 82 and the lower area along the template surfaces are provided with a chain links 85 therearound which cooperate and are driven by gear teeth 86 so that rotation of shaft 82 will also drive the platform. Again, a platform secured to the template surfaces will be biased to the right so as to maintain abutment of one of the template surfaces with guide member 80. When a different template surface shape is desired, shaft 82 can be elevated or lowered by utilizing features similar to that shown for FIGS. 4 or 6 or the platform may be elevated or lowered. Other types of drive may be substituted for the chain link and gear wheel drive illustrated. For example, friction drive means, air jet and similar means may be used as desired. The platform may be driven rotatably in either direction.

Figure 9:
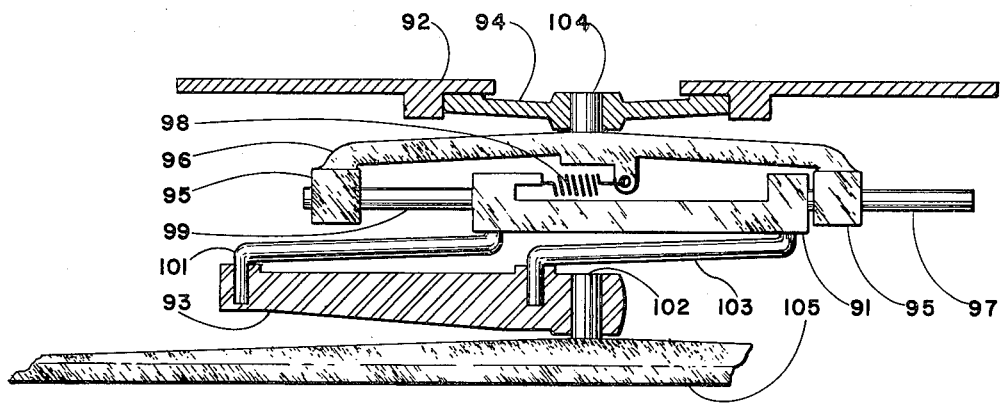
FIG. 9 is a side elevational view, partly in section of another embodiment of the invention utilizing a pivotal carriage direction indexing means.
Figure 10:
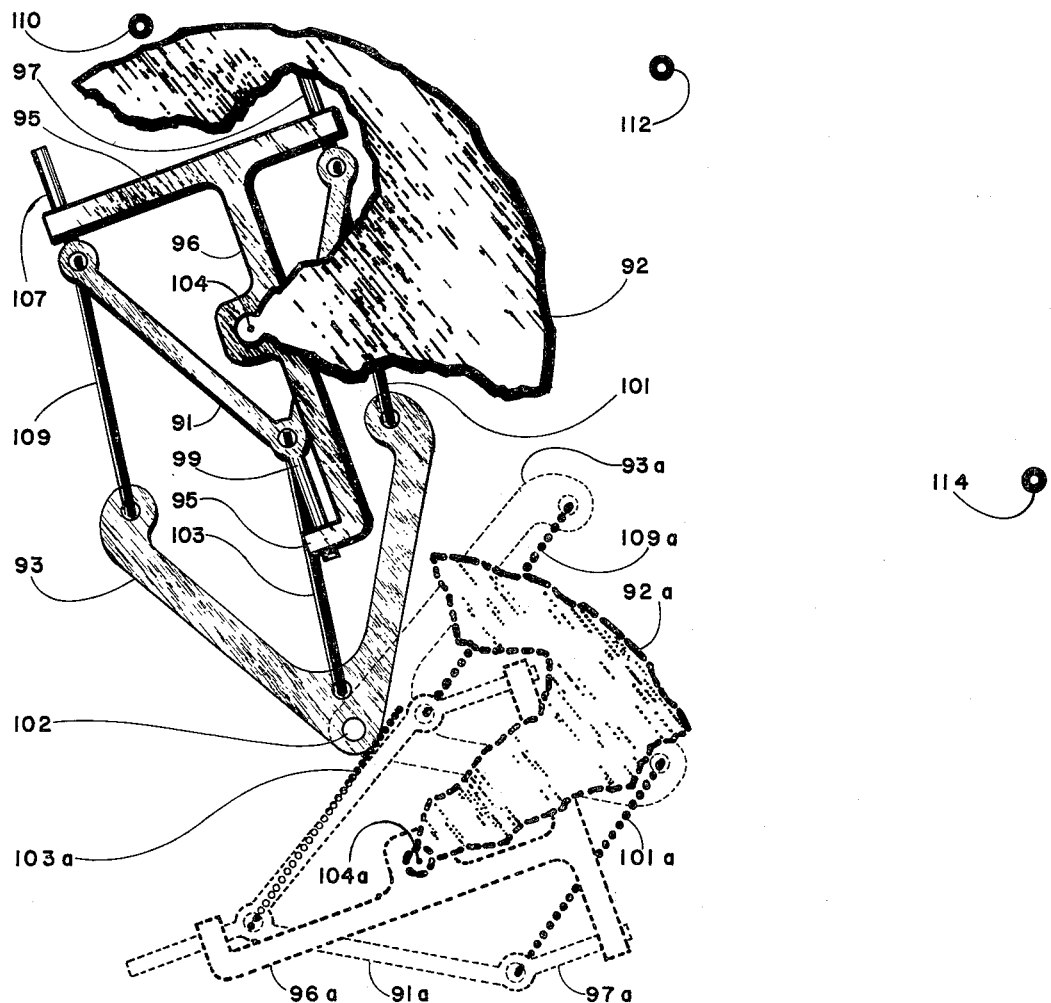
FIG. 10 is a partial top plan view of the embodiment illlustrated in FIG. 9 with the platform partially cut away showing two positions of the apparatus.
Figure 11:
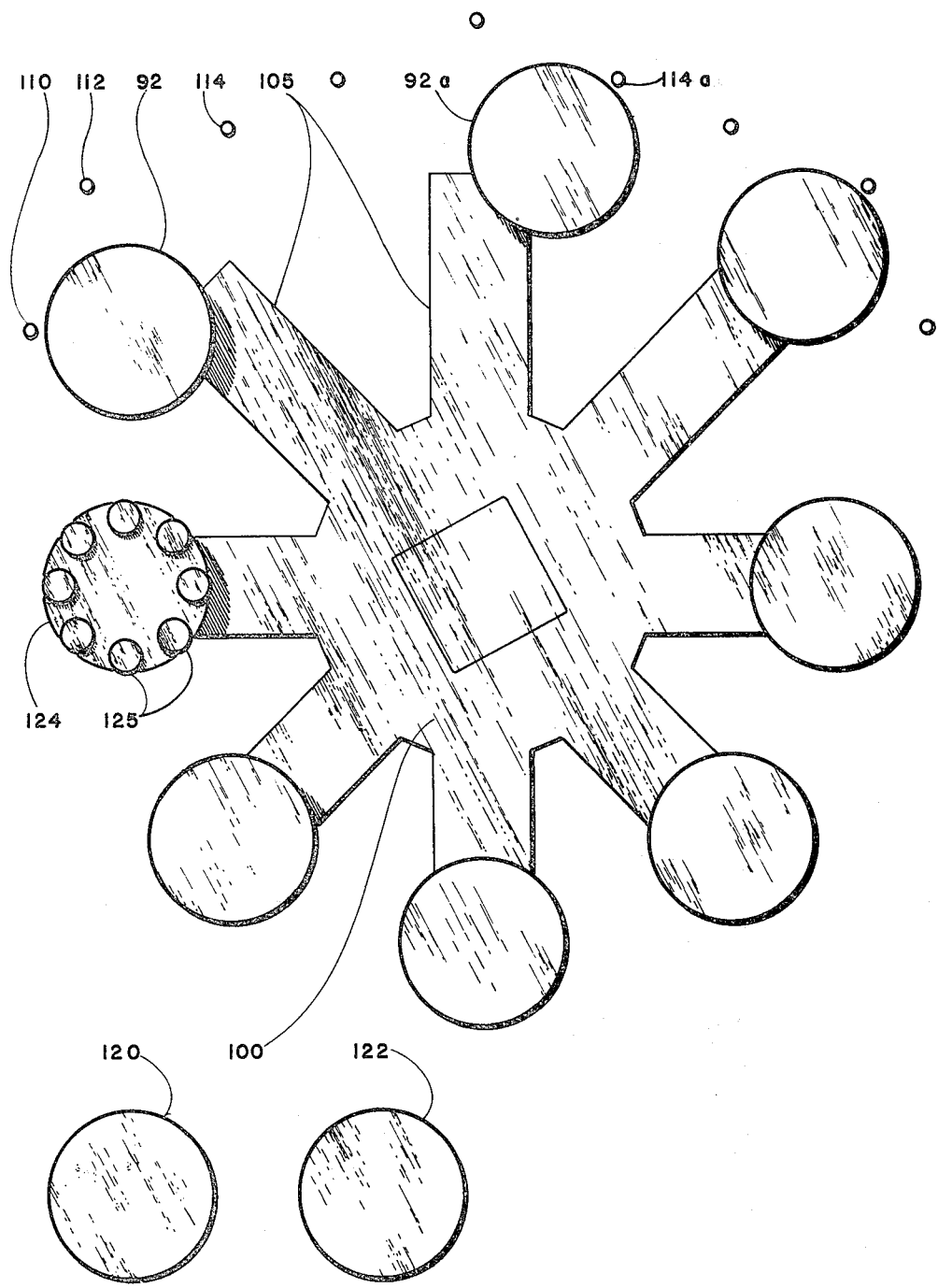
FIG. 11 is a top plan view illustrating a device similar to that of FIG. 1 utilizing the pivotal carriage concept of FIGS. 9 and 10.

FIGS. 9 and 10 illustrate a further embodiment of the invention whereby a rotating and reciprocating platform which may incorporate any one of the plural template embodiments illustrated and discussed hereinabove may be used. However, in this embodiment a platform directing apparatus is utilized whereby a single platform can be directed to a plurality of stationary working tools, one at a time, each of which tools may provide a similar or different operation on a material workpiece. For example, on a production line type of apparatus as illustrated in FIG. 11, and in which platforms 92 and 92a are directed to different material working or treating stations where a series of stationary working tools are located such an operation can be conveniently accomplished utilizing the apparatus illustrated in FIGS. 9 and 10. Accordingly, at one working station there are located working tools 110, 112 and 114 each of which provides a different operation on a material workpiece such as shaping, sanding, and polishing or buffing, respectively. Yet, such an operation can be accomplished by simply rotating arms 105 (FIG. 11) each of which has a different platform thereon to a work station and thereafter, the arms need not be further displaced since the complete operation may be accomplished with the working tools at that station.

Referring particularly to FIG. 10, a rotatable and reciprocating platform 92, which has been cut away to more clearly explain the attendant apparatus, is shown in a first position adjacent shaping tool 110. Referring also to FIG. 9, a pivotal carriage 93 is mounted on an upwardly extending support shaft 102 so that the carriage may be pivoted thereon to a desired position and then indexed and maintained in that position utilizing a retractable pin or other suitable indexing means not shown. Thus, in FIG. 10 pivotal carriage 93 is shown in a first position where it remains fixed in that position until it is desired to move it towards a different working tool. Platform 92 is secured to extension member 94 which rotates about shaft 104. Again, the rotating platform can be driven by any suitable means. Platform support 96 is provided with three sleeve members 95 which travel along guide rods 97, 99 and 107. This movement of platform support 96 will provide the reciprocal motion for platform 92 during the shaping operation.

It will also be noted in FIG. 10 that pivotal carriage is aligned so that guide shafts 97, 99 and 107 are directed toward working tool 110. Pivot arms 101, 103 and 109 are secured to pivotal carriage 93 so that platform 92 can be extended outwardly toward a working tool when the aforesaid pivot arms are turned in their sockets thereby extending the platform 92 toward the working tool 110 (FIG. 10) or the platform retracted away from the working tool as desired. This latter feature is illustrated in FIG. 10 in phantom wherein pivotal arms 101a, 103a and 109a are directed away from working tool 114 so that platform 92a is retracted.

The aforesaid pivotal arms are secured at their opposite ends to V-member 91 from which member shafts 97, 99 and 107 extend. Thus, it will be observed that the ends of each of the pivotal arms 101, 103 and 109 may be pivoted in connecting sockets on both V-member 91 and pivotal carriage 93 for movement of platform 92 from a first position shown in FIG. 10 to a second position illustrated in phantom. The platform and corresponding parts of the apparatus are shown with the designation a.

Observing again FIG. 9, reciprocal motion right and left from the angle of viewing is provided as platform support member 96 is biased to the left by biasing member in the form of spring 98. Again, using any one of the template and abutting guide member techniques and devices previously referred to in connection with FIGS. 2–8, as platform 92 rotates it may also be moved to the right or left so that working tool 110 may shape a material workpiece attached to platform 92 as determined by a template and guide member (not shown). The apparatus is supported by arm 105 with pivot 102. When the material workpiece or pieces have been shaped by shaping tool 110, the apparatus may be relocated so that working tool 112 or 114 may be utilized as shown in FIG. 10. In the phantom view of FIG. 10, platform 92a is shown in a retracted position prior to arms 101a, 103a and 109a being extended toward working tool 114 which will perform another operation on material workpieces.

Referring now also to FIG. 11, platform 92 is shown adjacent shaping tool 110 in a position as it would be utilizing the structure of the apparatus shown in FIG. 10. Platform 92a is shown adjacent working tool 114a in a position that the apparatus shown in phantom in FIG. 10 would be when the pivotal arms 101a, 103a and 109a are extended. Thus, when table 100 has been turned so that arms 105 are in a position as shown in FIG. 11, platform 92 may be utilized to shape and form material workpieces on any one of the working tools 110, 112 and 114 at that position simply by selecting the direction of pivotal carriage 93 (note FIG. 10), indexing or locking it in place in the direction of the desired working tool and thereafter rotating platform 92 until the shaping or working operation has been completed at each tool desired.

FIG. 11 also illustrates platform 124 having a plurality of superimposed individual material shaping platforms rotatably secured thereto. Thus, platforms 125 will be driven in rotation for shaping a material workpiece thereon while platform 124 will provide reciprocating motion utilizing cooperating template and guide member directing means as previously discussed. For example, platform 124 may act as the platform carriage shown in FIGS. 2 and 3. FIG. 11 also illustrates platforms 120 and 122 which may be provided with different templates of the type illustrated in FIGS. 4–8. Thus, platforms 120 and 122 having different template shapes thereon may be substituted for any of the other platforms shown to perform different forming, shaping or finishing operations.

Figure 1:
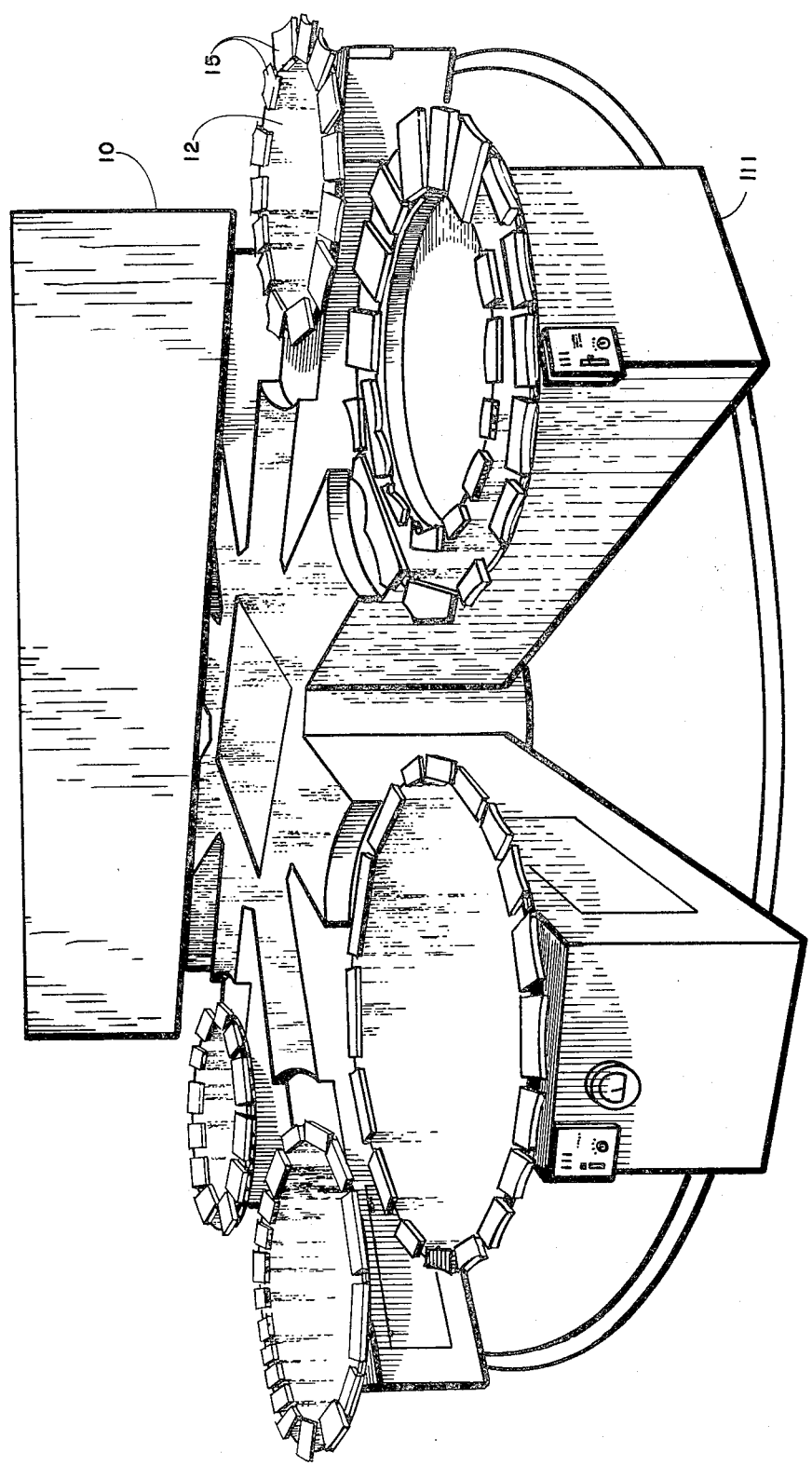
FIG. 1 is a perspective view illustrating the use of a plurality of platforms incorporating the concept of the invention.

FIG. 1 illustrates a subsequent embodiment of the invention utilizing any one of the concepts previously disclosed wherein a plurality of platforms 12 are provided with material workpiece 15 which are to be shaped by one or more stationary working tools located behind divider 10. The working or shaping tools are located behind the divider so that an operator may, utilizing any of the aforedescribed templates stand on the side of the divider viewed in FIG. 1, away from the working tools without danger of injury from either the working tool or pieces of material which are removed by the tool. Further, any of the aforementioned templates and guide members may be indexed by an operator either manually or automatically utilizing electronic and mechanical equipment built into the individual arms 11 shown in FIG. 1, place the material workpieces properly on the platform and secure them and then rotate the device shown in FIG. 1 so that the platforms become positioned with the working tool whereupon the material workpieces will be shaped as directed by the template and guide member. The use of such equipment and the modification thereof within the scope of the invention as described herein will be appreciated by those skilled in the art. Any type of material workpiece may be shaped utilizing the concepts and apparatus disclosed. The material may be wood, plastic, metal, etc., so long as the shaping or cutting tool is capable of acting on it.

I claim:

1. A device for guiding a material workpiece to be shaped by a working tool comprising a rotatable platform for mounting said workpiece thereon, a pivotal platform carriage, a platform support to which said platform is rotatably secured, said platform support having means for reciprocating travel therealong and arm members pivotally attached between said platform support and said pivotal carriage.

* * * * *